(12) United States Patent
Julius (10) Patent No.: US 9,052,044 B2
(45) Date of Patent: Jun. 9, 2015

(54) ADJUSTABLE ANGLE CUSHIONING SPOUT END

(71) Applicant: L CUBED CORPORATION, Dillsburg, PA (US)

(72) Inventor: Collin Bruce Julius, Dover, PA (US)

(73) Assignee: L Cubed Corporation, Dillsburg, PA (US)

( * ) Notice: Subject to any disclaimer, the term of this patent is extended or adjusted under 35 U.S.C. 154(b) by 105 days.

(21) Appl. No.: 13/934,406

(22) Filed: Jul. 3, 2013

(65) Prior Publication Data

US 2015/0008093 A1   Jan. 8, 2015

(51) Int. Cl.
  *B65G 11/00* (2006.01)
  *F16L 27/08* (2006.01)
  *B65G 69/18* (2006.01)

(52) U.S. Cl.
  CPC ............... *F16L 27/08* (2013.01); *B65G 69/18* (2013.01)

(58) Field of Classification Search
  CPC ........ B65G 11/083; B65G 69/18; F16L 27/08
  USPC ...................... 193/2 R, 2 A, 22, 32
  See application file for complete search history.

(56) References Cited

U.S. PATENT DOCUMENTS

| | | | |
|---|---|---|---|
| 2,634,842 A * | 4/1953 | Caylor | 193/32 |
| 3,762,746 A * | 10/1973 | Amada | 285/184 |
| 4,390,090 A * | 6/1983 | Kossebau | 193/32 |
| 4,479,743 A | 10/1984 | Stahl | |
| 4,645,055 A | 2/1987 | Griese et al. | |
| 5,009,552 A | 4/1991 | Talcott | |
| 6,691,852 B1 | 2/2004 | Nolin | |
| 7,850,209 B2 * | 12/2010 | Lutzer et al. | 285/281 |
| 8,640,857 B2 * | 2/2014 | Marchesini et al. | 198/658 |

* cited by examiner

*Primary Examiner* — William R Harp
(74) *Attorney, Agent, or Firm* — McNees Wallace & Nurick LLC (57) ABSTRACT

An adjustable cushioned angle spout end for directing particulate matter flow from an inlet spout to a discharge spout. The adjustable angle spout end includes a chamber having a first opening in fluid communication with the inlet spout and a second opening in fluid communication with the discharge spout. The inlet spout receiving member is rotated and secured into position relative to the discharge spout receiving member to properly align an inlet spout receiving opening with the inlet spout and a discharge spout receiving opening with the discharge spout. A baffle is positioned within the chamber in the path of the particulate matter flowing through the chamber. As the inlet spout receiving member is rotated relative to the discharge spout receiving member, the baffle remains in alignment with the inlet spout to properly cooperate with the particulate matter flow.

17 Claims, 7 Drawing Sheets

ADJUSTABLE ANGLE CUSHIONING SPOUT END

FIELD OF THE INVENTION

This invention relates to an adjustable angle spout end for directing particulate matter flow from an inlet spout to a discharge spout.

BACKGROUND OF THE INVENTION

When particulate matter such as corn, wheat, barley or the like is delivered to a grain elevator or is directed from the grain elevator to a truck or railroad car, for example, the stream flow of the particulate being transported must often times be redirected through an elbow to the place where the particulate matter is to be deposited. Even though these elbows are made of steel or similar material, the particulate matter, which flows at high velocity through the elbow, acts as an extremely abrasive material as it strikes an inner surface of the elbow. The abrasion caused by the particulate material leads to a rapid deterioration of the inner surface, impacted by the particulate material, which requires frequent repair or replacement.

Wear plates are typically mounted on the appropriate inner wall surfaces to protect conduits from the abrasive nature of the particulate matter such as shown in U.S. Pat. No. 4,645,055 to Griese et al.

Another technique which has been used incorporates baffles which are positioned in the stream flow when the particulate matter is caused to flow in a different direction. In devices using this technique, the baffles collect the particulate material during stream flow which acts as a shield to restrict wear of the inner surface. A device incorporating this technique is shown in U.S. Pat. No. 4,479,743 to Stahl. Such baffles typically collect particulate matter which remains trapped in the baffles when the stream flow to the baffles has stopped. If there is a long delay between successive uses of the devices, any trapped grain may contaminate successive uses. Trapped grain may also attract rodents or insects into the device after a grain flow stops.

U.S. Pat. No. 5,009,552 discloses a device which does not need to be replaced at frequent intervals, and is self-cleaning so that particulate matter is not trapped after a grain flow has stopped. The baffles of the elbow reduce the velocity of particulate matter being transported to downstream spouting equipment, and at the same time provide a structure to shield the elbow from abrasive wear. These internal baffles are known to cause a backing up of the material within the adjustable spout end when material is provided at a sufficiently high flow rate. Once a sufficient flow is present, the grain entering the adjustable spout end strikes the reservoir of grain backing up. The incoming grain is thereby relatively gently decelerated by collision with the numerous movable grain particles building up inside the adjustable spout end. Once the grain is slowed and transformed into a substantially vertical columnar flow, it enters the top of the bin.

While these adjustable spout ends have enjoyed much success and have been used extensively in the past, they do have some drawbacks.

As an example, the effectiveness and efficiency of the grain-to-grain deceleration, occurring when incoming grain strikes grain pooling within the adjustable spout end, is at least somewhat dependent upon the angle between the incoming spout and the baffles fixed within the adjustable spout end and upon the flow rate of material through the spout. These adjustable spout ends generally operate optimally at a maximum spout flow rate and at some angle of arrival between 38 degrees and 90 degrees. These adjustable spout ends often operate sub-optimally as the flow rate decreases and/or the angle of the spout departs from the optimal orientation.

Consequently, there exists a need for an improved device, method and system which overcomes the problems of the prior art and allows the grain or other free-flowing material to be moved in a cost effective manner with minimal damage to the material.

SUMMARY OF THE INVENTION

It is an object of the present invention to provide a system and method for decelerating particulate material in an efficient manner.

It is an object of the present invention to utilize an adjustable angle cushioning spout end which can be adjusted to different configurations.

An embodiment is directed to an adjustable angle spout end for directing particulate matter flow from an inlet spout to a discharge spout. The adjustable angle spout end includes a chamber having a first opening in fluid communication with the inlet spout and a second opening in fluid communication with the discharge spout. The chamber provides a path for the particulate matter to travel from the inlet spout to the discharge spout. The second opening is positioned below the first opening so that the particulate matter can exit the chamber under the influence of gravity. The first opening is positioned on an inlet spout receiving member. The inlet spout receiving member has a first flange. The second opening is positioned on a discharge spout receiving member. The discharge spout receiving member has a second flange which cooperates with the first flange. The inlet spout receiving member is rotated and secured into position relative to the discharge spout receiving member to properly align the first opening with the inlet spout and the second opening with the discharge spout.

An embodiment is directed to an adjustable cushioned angle spout end for directing particulate matter flow from an inlet spout to a discharge spout. The adjustable angle spout end includes a chamber having a first opening in fluid communication with the inlet spout and a second opening in fluid communication with the discharge spout. The chamber provides a path for the particulate matter to travel from the inlet spout to the discharge spout. The second opening is positioned below the first opening so that the particulate matter can exit the chamber under the influence of gravity. The first opening is positioned on an inlet spout receiving member. The inlet spout receiving member has a first flange. The second opening is positioned on a discharge spout receiving member. The discharge spout receiving member has a second flange which cooperates with the first flange. A baffle is positioned within the chamber in the path of the particulate matter flowing through the chamber, the center of an opening of the baffle positioned essentially in line with the longitudinal axis of the inlet spout. The inlet spout receiving member is rotated relative to the discharge spout receiving member, the baffle remains in alignment with the inlet spout to properly cooperate with the particulate matter flow.

An embodiment is directed to a method of installing an adjustable cushioned angle spout end for directing particulate matter flow from an inlet spout to a discharge spout. The method includes: aligning a discharge spout receiving opening provided in a discharge spout receiving member of the adjustable cushioned angle spout with the discharge spout; rotating an inlet spout receiving member having an inlet spout receiving opening such that the inlet spout receiving opening is aligned with the inlet spout; and securing the discharge spout receiving member to the inlet spout receiving member.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The present invention will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that spatially relative terms, such as "top", "upper", "lower" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "over" other elements or features would then be oriented "under" the other elements or features. Thus, the exemplary term "over" can encompass both an orientation of over and under. The device may be otherwise oriented (rotated 90 degrees or at other orientations) and the spatially relative descriptors used herein interpreted accordingly.

Figure 1:
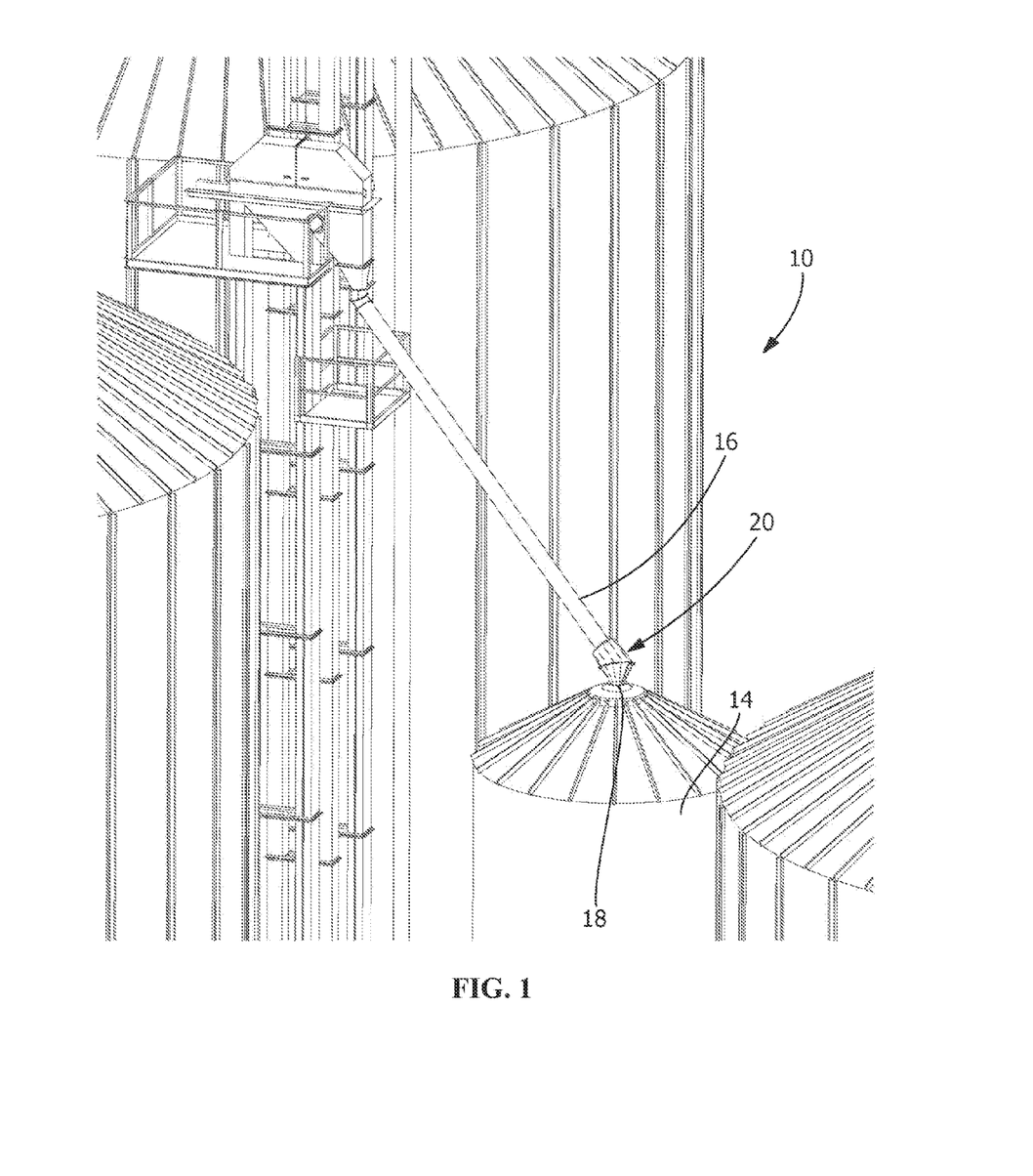
FIG. 1 is a perspective view of a grain elevator system in which an adjustable angle cushioning spout end of the present invention is used.

Now referring to the drawings wherein like numerals refer to like matter throughout, and more specifically referring to FIG. 1, there is shown a grain elevator system generally designated 10, including an elevated position from which grain or other dry bulk material is provided to a grain or storage bin 14, via an angled gravity flow down spout or inlet spout 16 with an adjustable angle cushioning spout end 20 disposed at its lower end. The entire grain elevator system 10, except for adjustable angle cushioning spout end 20, is well known in the industry.

While the angled gravity flow down spout 16 is shown as being a pipe having a circular cross section, it should be understood that this is only one embodiment of the present invention. The down spout 16 could be, but is not limited to, any shaped member, conduit, channel, pipe, tube, chute, shaft, such as, but not limited to, a square or round chute. In the embodiment shown, the angled gravity flow down spout 16 is gravity fed; however, in some instances, it may be desired to have some mechanism for assisting material in flowing through the spout, such as, but not limited to, a conveyor, auger or other material moving apparatus.

Figure 2:
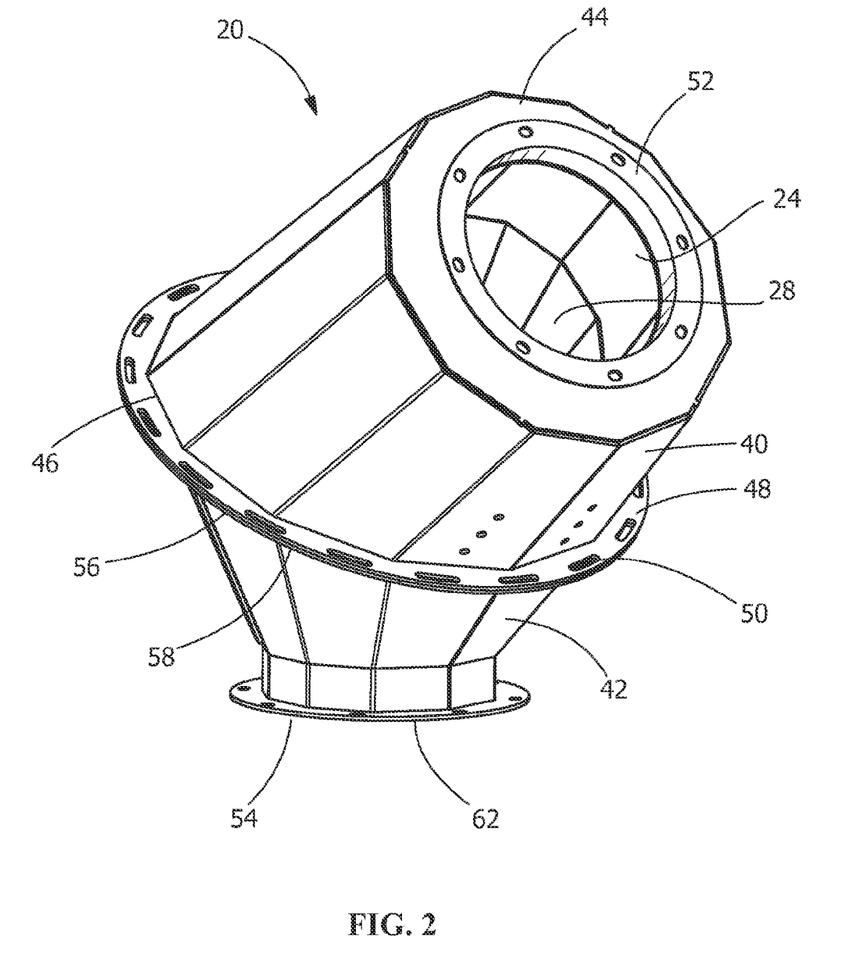
FIG. 2 is a perspective view of an illustrative embodiment of the adjustable angle cushioning spout end of the present invention.
Figure 3:
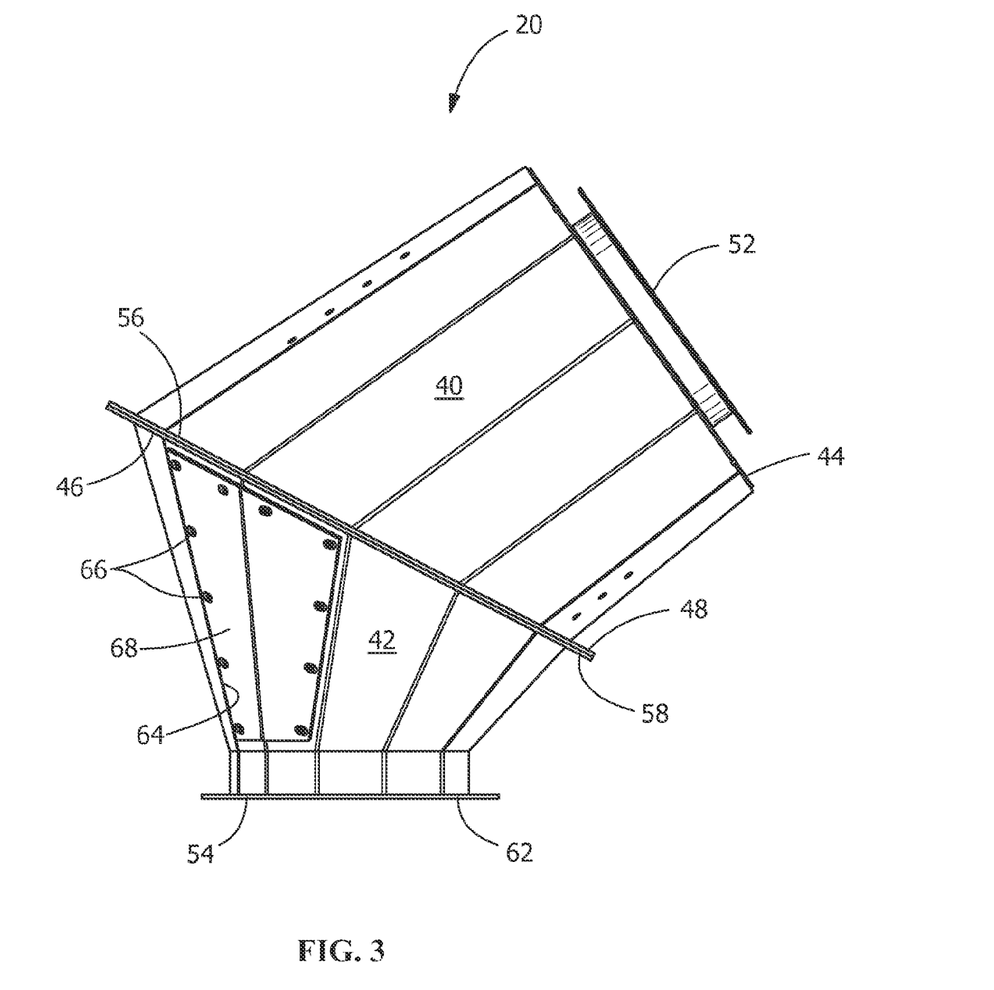
FIG. 3 is a side view of the adjustable angle cushioning spout end of FIG. 2.
Figure 4:
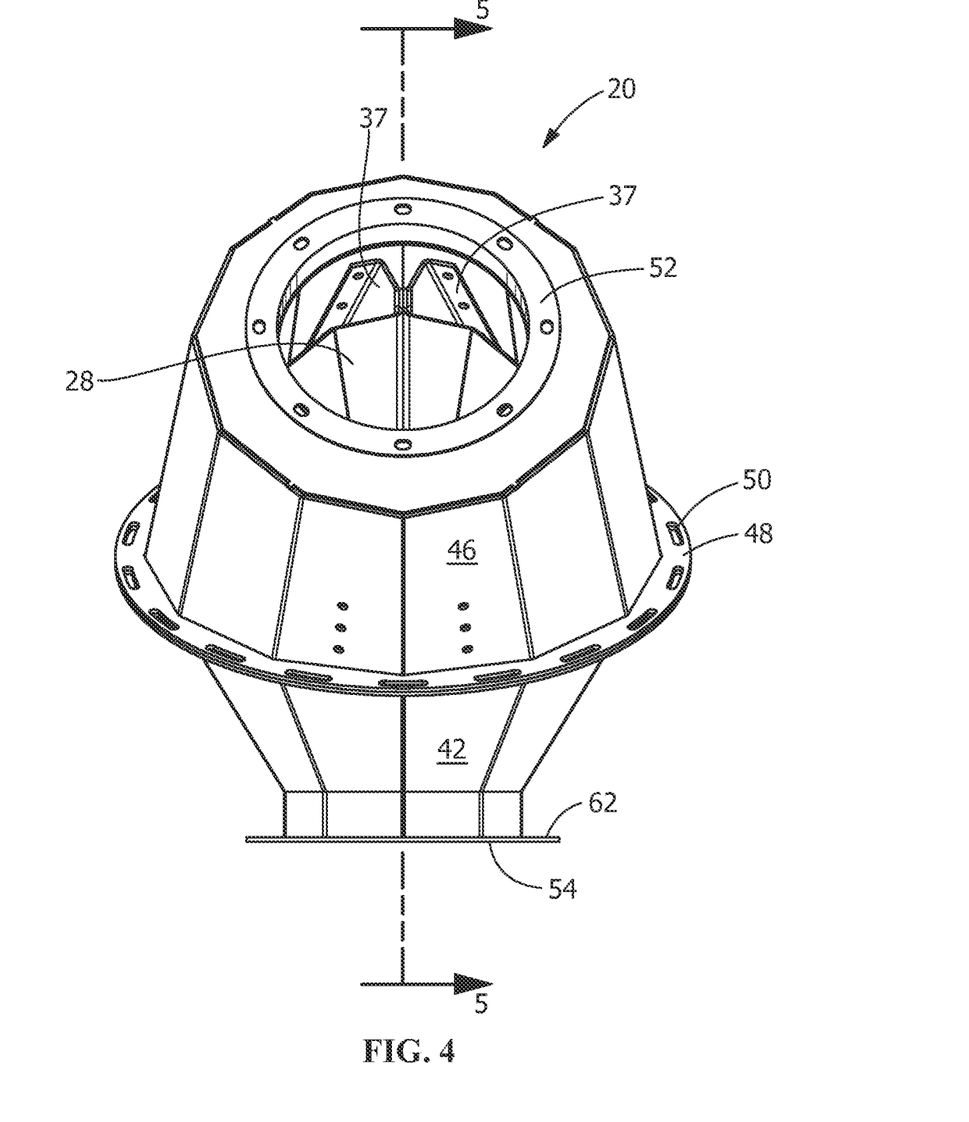
FIG. 4 is a front view of the adjustable angle cushioning spout end of FIG. 2.

Referring to FIG. 2, a perspective view of the grain flow control elbow or adjustable angle cushioning spout end 20 is shown. In general, particulate matter, such as, but not limited to, grain or other dry bulk free-flowing material, flows into the spout end 20 through the entrance or inlet spout 16 and leaves the spout end 20 through a discharge spout 18 which in connected to the storage bin 14.

Figure 5:
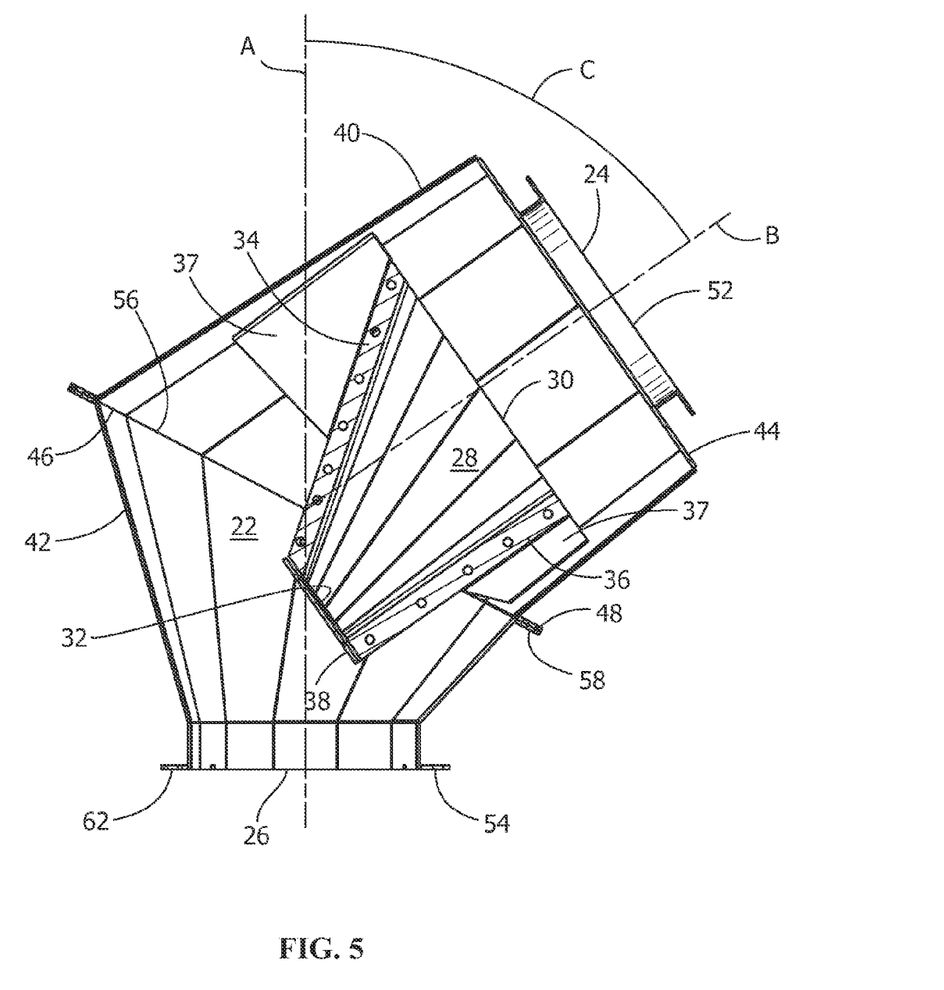
FIG. 5 is a cross-sectional view of the adjustable angle cushioning spout end taken along line 5-5 of FIG. 4.

As best shown in FIG. 5, the spout end 20 includes a chamber 22 having a first opening 24 in fluid communication with the inlet spout 16 and a second opening 26 in fluid communication with the discharge spout 18. The chamber 22 provides a path for the particulate matter to travel from the inlet spout 16 to the discharge spout 18. The discharge spout 18 is located below the first opening 24 so that the particulate matter can exit the chamber 22 under the influence of gravity. Further, the inlet spout 16 is positioned so that the direction of stream of particulate matter flow through the inlet spout 16 is at an angle C of between approximately 0 degrees as measured from the longitudinal axis A of the discharge spout 18 to the longitudinal axis B of the inlet spout 16 to approximately 55 degrees as measured from the longitudinal axis A of the discharge spout 18 to the longitudinal axis B of the inlet spout 16.

A baffle 28 is positioned within the chamber 22 in the path of the particulate matter flowing through the chamber 22. The baffle 28 has a general conical shape with a large opening 30 at one end and a small opening 32 at the opposite end. The center of the large opening 30 is positioned essentially in line with the longitudinal axis B of the inlet spout 16. In contrast, the center of the small opening 32 is not in line with the longitudinal axis B of the inlet spout 16, as the baffle 28 has a longer wall 34 and a shorter wall 36, as viewed in FIG. 5. However, other configurations may be used without departing from the scope of the invention. The large opening 30 is proximate to, but spaced from the inlet opening 24. The baffle 28 extends from the large opening 30 in a direction toward the discharge opening 26, such that the small opening 32 is positioned closer than the large opening 30 to the discharge opening 26. The baffle 28 is positioned and sized to slow the flow of particulate matter through the chamber 22, as will be more fully described.

In the illustrative embodiment shown, the baffle 28 is secured to the walls of the chamber 22 of the connector member 20 by mounting brackets 37, as best shown in FIG. 5. The mounting brackets 37 are one illustrative way to mount the baffle 28. However, the baffle 28 may be mounted in the chamber 22 using various known methods without departing from the scope of the invention. The mounting brackets are secured to the walls of the chamber 22 and to the baffle 28 using conventional hardware, such as, but not limited to, nuts and bolts. However, other known mounting hardware and methods may be used without departing from the scope of the invention.

During flow of particulate matter into the chamber 22, the particulate matter first fills the volume of the baffle 28, such that the flow of the particulate matter into the baffle 28 of the chamber 22 slows the flow of the particulate matter, preventing the particulate matter from striking the walls of the chamber 22 at a high rate of speed. With the volume of the baffle 28 filled, the further flow of particulate matter into the chamber 22 strikes the particulate matter trapped by the baffle 28 which prevents abrasion of the longer wall 34 of the baffle 28. The fact that the flow of particulate matter entering the chamber 22 strikes the reservoir of the particulate matter in the baffle 28 facilitates the gentle deceleration of the incoming particulate matter, causing little to no damage of the particulate matter. When the flow of particulate matter through the inlet spout 16 has stopped, any particulate matter remaining in the baffle 28 slides through the conical member and out the small opening 32 to the discharge spout 18.

In order to facilitate the accumulation of the particulate matter in the baffle 28, an optional flow restriction plate 38 may be provided proximate the small opening 32. The flow restriction plate 38 is secured tight up against the opening 26 of the baffle 38. In so doing, the flow of the particulate material through the opening 26 is prevented, there ensuring that there will always be a cushion of particulate material provided in the baffle. The flow restriction plate 38 may be mounted to allow the plate 38 to be moved or slid away from the opening 32 when desired. This provides a method for restricting the flow of particulate material out of the baffle while allowing the particulate material to flow through the baffle 28 when desired. This option is useful in situations in which the flow of the particulate matter from the inlet spout 16 is slow enough that the baffle would never fill up and therefore fail to provide a protective cushion.

Alternatively, the plate 38 is provided in line with the opening 32 but is spaced from the opening 32 to allow the particulate matter to pass through the opening 32 in a slowed and controlled manner. This allows the particulate matter to accumulate in the baffle 28 when the particulate matter is discharged from the inlet spout 16. This also allows the accumulated particulate matter to be discharged from the baffle 28 through the opening 32 when the flow of particulate matter through the inlet spout 16 is stopped.

As shown in the FIGS. 2 through 5, the spout end 20 includes an inlet spout receiving member 40 and a bin attachment member or discharge spout receiving member 42. The baffle 28 is attached to the inlet spout receiving member 40. In the embodiment shown, when the inlet spout receiving member 40 and the discharge spout receiving member 42 are assembled together, a portion of the baffle 28 extends into the discharge spout receiving member 42. However, other configurations may be used without departing from the scope of the invention.

The inlet spout receiving member 40 has a first end 44 and a second end 46. In the embodiment shown, the first end has a generally circular configuration; however other configurations may be used without departing from the scope of the invention. The inlet opening 24 extends through the first end 44. The second end 46 has a generally circular configuration which is larger than that circular configuration of the first end 44; however other configurations may be used without departing from the scope of the invention. A flange 48 is provided on the second end 46. The flange 48 extends from the wall of the inlet spout receiving member 40 in a direction away from the chamber 22. Openings 50 which extend through the flange 48 are provided periodically along the flange 48.

A collar 52 may be provided at the first end 44. The collar 52 attaches to the inlet spout 16 using known hardware and mounting techniques. In various embodiments, the collar 52 may be movable relative to the first end 44, thereby allowing the collar 52 to: adjust for expansion and contraction of the components of the system 10 resulting from loading forces; thermal expansion characteristics of the components; and measurement tolerances for cutting a length of the inlet spout 16.

The discharge spout receiving member 42 has a first end 54 and a second end 56. In the embodiment shown, the first end has a generally circular configuration; however other configurations may be used without departing from the scope of the invention. The discharge opening 26 extends through the first end 54. The second end 56 has a generally circular configuration which is larger than the circular configuration of the first end 54; however other configurations may be used without departing from the scope of the invention. The walls of the discharge spout receiving member 42 are tapered inwardly toward the discharge opening 26 to ensure that the particulate matter will flow from the second end 56 to the first end 54 with no obstructions. A flange 58 is provided on the second end 56. The flange 58 extends from the wall of the discharge spout receiving member 42 in a direction away from the chamber 22. Openings 60 which extend through the flange 58 are provided periodically along the flange 58.

In the embodiment shown, the diameter of the first end 54 is approximately the same as diameter of the discharge spout 18. This ensures that all of the particulate matter will flow through the discharge opening 26 to the discharge spout 18. A mounting flange 62 extends from the first end 54 of the discharge spout receiving member 42. The mounting flange 62 mounts to the discharge spout 18 or the bin 14, as appropriate, using known hardware and mounting techniques.

An opening 64 is provided in a wall of the discharge spout receiving member 42. The opening 64 allows an operator to access the inside of the chamber 22 to inspect, perform maintenance, or repair the components of the spout end 20, including the baffle 28. A plate 68 covers the opening 64 when the operator does not require access. Known hardware 66, such as, but not limited to, self clenching studs, removably secure the plate 68 in place.

In use, the inlet spout receiving member 40 and the discharge spout receiving member 42 are shipped to the site. During shipping the inlet spout receiving member 40 and the discharge spout receiving member 42 are separate pieces which have not been joined together. At the site, the operator or installer, places the inlet spout receiving member 40 and the discharge spout receiving member 42 in mating arrangement, whereby the flange 48 of the inlet spout receiving member 40 is aligned with the flanges 58 of the discharge spout receiving member 42. With the flanges 48, 58 aligned the inlet spout receiving member 40 can be rotated relative to the discharge spout receiving member 42. In so doing, the inlet opening 24 can be rotated relative to the discharge opening 26 to accommodate for various configurations of the inlet spout 16 and the discharge spout 18.

Figure 6:
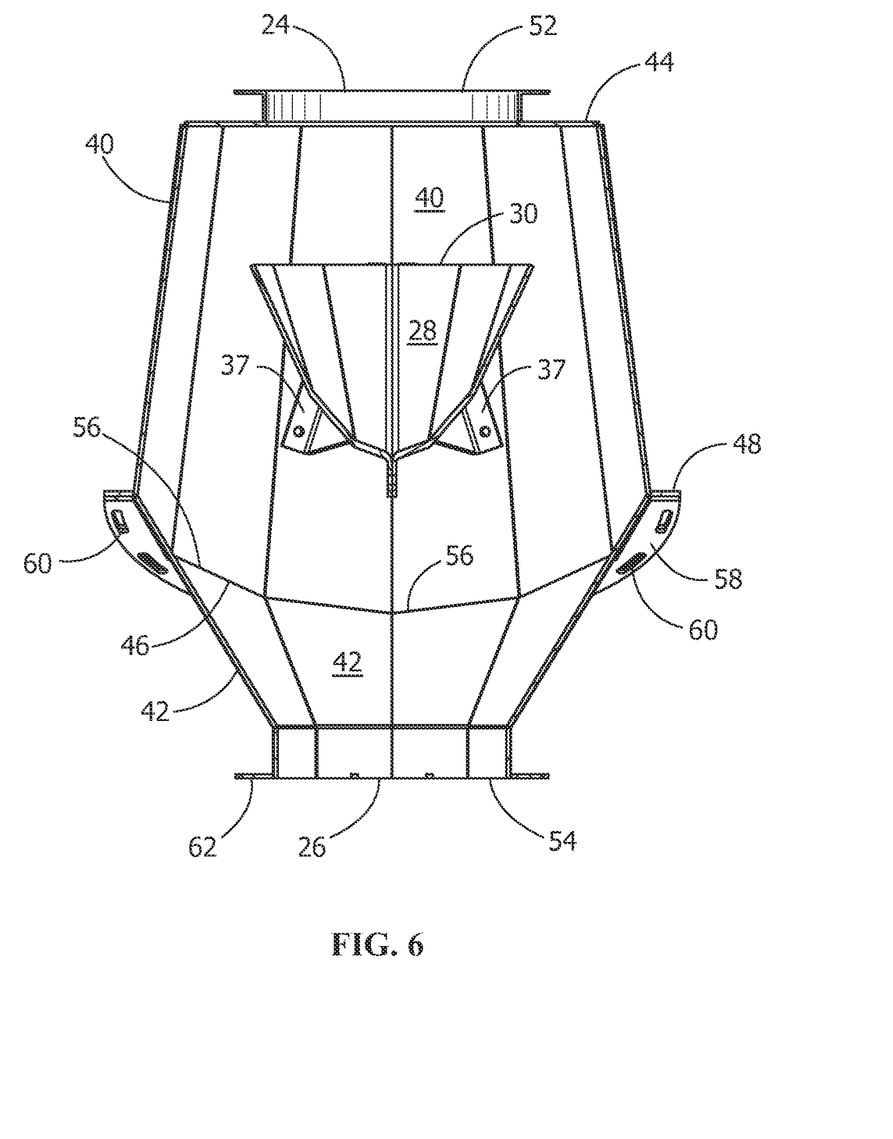
FIG. 6 is a cross-sectional view of the adjustable angle cushioning spout end showing the inlet spout receiving member rotated to a different position relative to the discharge spout receiving member than is shown in FIG. 5.
Figure 7:
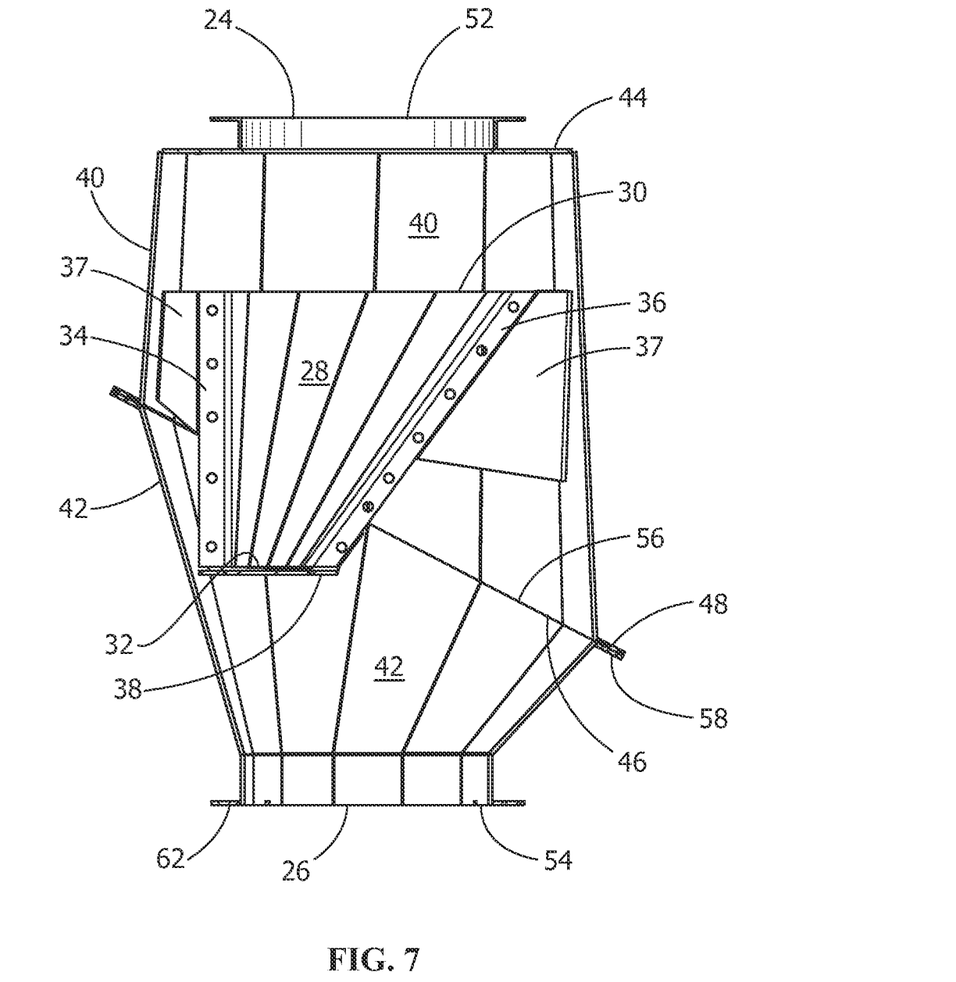
FIG. 7 is a cross-sectional view of the embodiment of FIG. 6 taken along longitudinal axis of the adjustable angle cushioning spout end as rotated 90 degrees from that shown in FIG. 6.

In the embodiment shown, the inlet spout receiving member 40 can be rotated relative to the discharge spout receiving member 42, such that the inlet spout 16 positioned in the inlet opening 24 can be positioned at an angle C of between approximately 0 degrees as measured from the longitudinal axis A of the discharge spout 18 to the longitudinal axis B of the inlet spout 16 (as shown in FIGS. 6 and 7) to approximately 55 degrees as measured from the longitudinal axis A of the discharge spout 18 to the longitudinal axis B of the inlet spout 16 (as shown in FIGS. 2 through 5).

Once the appropriate positioning of the inlet spout receiving member 40 relative to the discharge spout receiving member 42 is determined, hardware is positioned in the openings 50, 60 of flanges 48, 58 to secure the inlet spout receiving member 40 to the discharge spout receiving member 42. The openings 50, 60 are spaced periodically about the flanges 48, 58 such that no matter the position of the inlet spout receiving member 40 relative to the discharge spout receiving member 42, respective openings 50, 60 will align to allow for the insertion of mounting hardware therein. In the embodiment shown, conventional hardware, such as, but not limited to, nuts and bolts are used to secure the inlet spout receiving member 40 to the discharge spout receiving member 42. However, other known mounting hardware and methods may be used without departing from the scope of the invention.

By allowing the inlet spout receiving member 40 to rotate relative to the discharge spout receiving member 42, the same parts can be used for many different orientations of the inlet spout 16 relative to the discharge spout 18. This eliminates the need for multiple parts to be manufactured and stocked to accommodate different configurations.

As the baffle 28 is mounted to the inlet spout receiving member 40, the positioning of the baffle 28 relative to the inlet opening 24 and the inlet spout 16 remains constant, no matter how the inlet spout receiving member 40 is rotated relative to the discharge spout receiving member 42. Consequently, the effectiveness of the baffle 28 is not reduced as the inlet spout receiving member 40 is rotated relative to the discharge spout receiving member 42. In other words, as the inlet spout receiving member 40 is rotated relative to the discharge spout receiving member 42, the baffle 28 remains in alignment with the inlet spout 16 to properly cooperate with the particulate matter flow.

As the flow of particulate matter is started, the particulate matter enters chamber 22 through the inlet spout 16 and is directed toward baffle 28 which is oriented in line with the longitudinal axis B of the inlet spout 16. Some particulate matter is retained in baffles 28 to act as a shield against abrasion of the baffle walls 34, 36. Most of the particulate matter is deflected by this grain shield toward the discharge spout 18. In embodiments where the plate 38 is not provided or is spaced from the opening 32, the small amount of particulate matter continually slipping through opening 32 of the baffle 28 is constantly replenished with incoming particulate matter from the stream flow. Whenever the stream flow ceases, any particulate matter remaining in the baffle continues to slide toward the discharge spout 18 through the opening 32 until all of the particulate matter is exhausted or drained from inside the spout end 20.

The particulate matter retained in the baffle 28 of the chamber 22 also slows the flow of the particulate matter, preventing the incoming particulate matter from striking the walls of the chamber 22 at a high rate of speed. The deceleration of the particulate matter prior to striking the walls of the inlet spout receiving member 40 and/or the discharge spout receiving member 42 greatly reduces abrasive wear to the members 40, 42.

As the spout end 20 completely encloses the chamber 22, outside elements, such as rain, are prevented from entering the chamber 22. In addition, grain dust, etc. are prevented from exiting into the air through spout end 20.

This invention can be used for, but is not limited to, grain, grain handling, grain elevators, grain bins and to feed and feed mills. However, it should be understood that the present invention is not intended to be limited to grain and feed handling and should be hereby construed to include other agricultural and non-agricultural applications as well. For example only, and not intended as a limitation, the particulate matter or dry bulk material may be corn, soybeans, wheat, rice, almonds, walnuts, peas, coffee beans, paint pigment, fertilizer, plastics, or any free-flowing dry bulk material. The term "particulate matter" is intended to refer to the above-listed materials and other materials having similar properties.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An adjustable angle spout end for directing particulate matter flow from an inlet spout to a discharge spout, the adjustable angle spout end comprising:
   a chamber having a first chamber opening in fluid communication with the inlet spout and a second chamber opening in fluid communication with the discharge spout, the chamber providing a path for the particulate matter to travel from the inlet spout to the discharge spout, the second chamber opening is positioned below the first chamber opening so that the particulate matter can exit the chamber under the influence of gravity;
   a baffle positioned within the chamber in the path of the particulate matter flowing through the chamber, the baffle having a generally conical shape with a large baffle opening at one end and a small baffle opening at the opposite end;
   a flow restriction plate is provided proximate the small baffle opening;
   an inlet spout receiving member, the first chamber opening being positioned on the inlet spout receiving member, the inlet spout receiving member having a first flange;
   a discharge spout receiving member, the second chamber opening positioned on the discharge spout receiving member, the discharge spout receiving member having a second flange which cooperates with the first flange;
   wherein the inlet spout receiving member is rotated and secured into position relative to the discharge spout receiving member to properly align the first chamber opening with the inlet spout and the second chamber opening with the discharge spout.

2. The adjustable angle spout end as recited in claim 1, wherein the inlet spout receiving member can be rotated relative to the discharge spout receiving member between an angle of between approximately 0 degrees as measured from a longitudinal axis of the discharge spout to the a longitudinal axis of the inlet spout and approximately 55 degrees as measured from the longitudinal axis of the discharge spout to the longitudinal axis of the inlet spout.

3. The adjustable angle spout end as recited in claim 1, wherein the center of the large baffle opening is positioned essentially in line with the longitudinal axis of the inlet spout.

4. The adjustable angle spout end as recited in claim 3, wherein the large baffle opening is proximate to, but spaced from the first chamber opening.

5. The adjustable angle spout end as recited in claim 1, wherein the baffle is attached to the inlet spout receiving member.

6. The adjustable angle spout end as recited in claim 1, wherein as particulate matter is flowed into the chamber, the particulate matter first fills the volume of the baffle so that further flow of particulate matter into the chamber strikes the particulate matter trapped by the baffle preventing abrasion of the adjustable angle spout end and minimizing damage to the particulate matter.

7. The adjustable angle spout end as recited in claim 1, wherein the flow restriction plate is secured tight up against the small baffle opening of the baffle to prevent the flow of the particulate material through the small baffle opening.

8. The adjustable angle spout end as recited in claim 1, wherein the flow restriction plate is spaced from the small baffle opening to allow the particulate matter to pass through the small baffle opening in a slowed and controlled manner.

9. An adjustable cushioned angle spout end for directing particulate matter flow from an inlet spout to a discharge spout, the adjustable angle spout end comprising:
    a chamber having a first opening in fluid communication with the inlet spout and a second opening in fluid communication with the discharge spout, the chamber providing a path for the particulate matter to travel from the inlet spout to the discharge spout, the second opening being positioned below the first opening so that the particulate matter can exit the chamber under the influence of gravity;
    an inlet spout receiving member, the first opening being positioned on the inlet spout receiving member, the inlet spout receiving member having a first flange;
    a discharge spout receiving member, the second opening positioned on the discharge spout receiving member, the discharge spout receiving member having a second flange which cooperates with the first flange;
    a baffle positioned within the chamber in the path of the particulate matter flowing through the chamber, the baffle having a conical shape, the center of an opening of the baffle positioned essentially in line with the longitudinal axis of the inlet spout;
    wherein the inlet spout receiving member is rotated relative to the discharge spout receiving member, the baffle remains in alignment with the inlet spout to properly cooperate with the particulate matter flow.

10. The adjustable cushioned angle spout end as recited in claim 9, wherein the inlet spout receiving member can be rotated relative to the discharge spout receiving member between an angle of between approximately 0 degrees as measured from a longitudinal axis of the discharge spout to the a longitudinal axis of the inlet spout and approximately 55 degrees as measured from the longitudinal axis of the discharge spout to the longitudinal axis of the inlet spout.

11. The adjustable cushioned angle spout end as recited in claim 9, wherein the baffle has a large opening at one end and a small opening at the opposite end.

12. The adjustable cushioned angle spout end as recited in claim 9, wherein the baffle is attached to the inlet spout receiving member.

13. The adjustable cushioned angle spout end as recited in claim 9, wherein as particulate matter is flowed into the chamber, the particulate matter first fills the volume of the baffle so that further flow of particulate matter into the chamber strikes the particulate matter trapped by the baffle preventing abrasion of the adjustable angle spout end and minimizing damage to the particulate matter.

14. The adjustable cushioned angle spout end as recited in claim 9, wherein a flow restriction plate is provided proximate the small opening.

15. The adjustable cushioned angle spout end as recited in claim 14, wherein the flow restriction plate is secured tight up against the small opening of the baffle to prevent the flow of the particulate material through the small opening.

16. The adjustable cushioned angle spout end as recited in claim 14, wherein the flow restriction plate is spaced from the small opening to allow the particulate matter to pass through the small opening in a slowed and controlled manner.

17. A method of installing and using an adjustable cushioned angle spout end for directing particulate matter flow from an inlet spout to a discharge spout, the method comprising:
    aligning a discharge spout receiving opening provided in a discharge spout receiving member of the adjustable cushioned angle spout with the discharge spout;
    rotating a inlet spout receiving member having an inlet spout receiving opening such that the inlet spout receiving opening is aligned with the inlet spout;
    securing the discharge spout receiving member to the inlet spout receiving member; and
    flowing the particulate matter through a baffle;
    filling a volume of the baffle with the particulate matter to allow for the further flow of particulate matter into the chamber to strike the particulate matter trapped by the baffle preventing abrasion and minimizing damage to the particulate matter.

* * * * *